Patented June 10, 1924.

1,497,461

UNITED STATES PATENT OFFICE.

WILLIAM BRADFORD OLIVER, OF COLLINGSWOOD, NEW JERSEY.

MOLASSES CARRIER.

No Drawing.   Application filed January 17, 1922. Serial No. 529,928.

*To all whom it may concern:*

Be it known that I, WILLIAM BRADFORD OLIVER, a citizen of the United States, residing in Collingswood, Camden County, New Jersey, have invented a Molasses Carrier, of which the following is a specification.

One object of this invention is to provide means for supplying molasses for food purposes in such form as to substantially eliminate the objectionable, sticky characteristics, and to greatly facilitate its transportation, storage, and handling.

A further object is to provide a molasses-carrying food especially adapted for feeding to live stock; said food permitting the feeding of the molasses in exactly desired amounts, and being capable at the same time of taking its place in a balanced ration as one of the constituent parts thereof; said food further being such that the difficulties and dangers usually attendant on the feeding of molasses to live stock are entirely eliminated and the cost of this commodity greatly reduced.

The value of molasses as a food, relish or conditioner for cattle is well known, it having very desirable effects on the digestive organs and general health of stock, and materially increasing the milk flow of dairy cows. Due, however, to the great difficulty and expense of transporting and storing molasses; the great difficulty of getting the molasses out of the barrels in cold weather and the necessity for use at such times of hot water, which latter as a rule is not available in stock barns; the danger of overfeeding due to undissolved lumps or masses of molasses, which overfeeding tends to scour stock and to bring about abortion in cows in advanced pregnancy; and due finally to the inevitable mussiness of the raw molasses, the majority of stock feeders prefer to forego the great benefits derived from this material, and those who do feed it, do so sparingly.

I have discovered a method whereby the difficulties of transportation and storage and those normally experienced in handling the molasses in the feeding operation are entirely eliminated; whereby the molasses may be fed in such form as to do away with all danger of overfeeding; and whereby the objections due to the undesirable stickiness and mussiness are entirely overcome.

In carrying out my invention, I employ an edible carrier capable of absorbing or taking up a comparatively large proportion of its own weight in molasses, this carrier preferably being a material or food product of general adaptability for feeding purposes and one of recognized merit and in general use as a food.

It is essential for the purposes of this invention that the carrier be capable of taking up at least 75% of its own weight of molasses under normal conditions without undue stickiness or caking, and I have discovered that cereal brans, preferably wheat bran, meet all the conditions requisite for use in my invention, since wheat bran will carry 100% of its own weight in molasses without undue stickiness or massing of its particles, and by drying after absorption has well advanced, may be made to carry 200% or more of molasses without the objectionable features common to liquid molasses. Bran furthermore is among the cheapest of concentrates, and wheat bran the most universally available and universally used of all by-product concentrates. Furthermore the use of bran and its merit as a food is well understood in the art, and the user of my material will accordingly not be compelled to purchase an article, that he would not otherwise, in order to get the molasses which he may desire.

I have discovered that the brans besides possessing great absorbent power are otherwise particularly well adapted for my purpose owing to a certain elasticity or springiness in the particles or flakes that resists compression or adhesion of the particles into balls or hard masses. I have found further that after mixing the molasses and the carrier medium and allowing them to stand in contact with the air or other drying medium for a period of time, there will result as a final product a homogeneous granular substance in which the flakes themselves are distorted in such manner as to form with the finer particles of the medium the individual grains of the product. Due to the granular condition of the product, the material may be readily mixed with the usual grains and concentrates fed to stock in compounding balanced rations with no danger of a massing of the materials or an accumulation of molasses in masses, the latter being evenly distributed through the entire mass of the ration.

Under certain conditions, and with certain grades of molasses such as final or plantation blackstrap, there may develop a persistent gumminess where the percentage in relation to the carrier medium is high. Where this gumminess develops, I have found it desirable to employ the following process: The bran or other carrier medium may be passed through a drying process to remove the inherent moisture. For this purpose, the medium may either be heated or exposed to drying air currents, preferably warm. The medium, dried or otherwise, is mixed with molasses and the mixture heated in a hot oven or drier for a short time to eliminate excessive moisture. To facilitate the mixing operation, the molasses may be heated in advance to give the desired fluidity, but it is preferable that the preheating temperature be not greater than 105° F., since high temperatures will tend to caramelize the sugar and will create in the molasses chemical changes which are unfavorable. The mixture which now is semi-dry and somewhat gummy and with a tendency to dry in mass, I then place in a suitable mixer, and while agitating add a meal or flour, or, in fact, any dust-like material, preferably having flakes of non-soluble and but slightly absorbent nature, such as middlings, ground oats, corn meal, or ground hay or straw. The mixture of molasses and edible carrier quickly breaks up into small irregularly shaped masses or nodules, each quickly coating itself with a layer of dust, and the hard insoluble flakes overcoming any further tendency to objectionable packing or massing of the material. Under these conditions, it is assured that the material will carry, store and remain in suitable condition for a stock food ingredient.

I further find that this dusting off process is desirable in all instances, regardless of the quality of the molasses employed or the process by which the mixture is formed, since it prevents any undue tendency of the molasses and carrier massing or packing in the bag or other container during hot-humid or wet weather periods, and preserves unchanged the granular condition of the product. Also, by utilizing this dusting process, it is possible successfully to employ as the carrier medium materials such as gluten, corn meal and oil meal which otherwise would be impracticable owing to their inability to carry the requisite amounts of molasses without objectionable packing and gumminess.

As is well known to those acquainted with the art, a balanced ration in which my material will generally be employed is composed of several edible ingredients selected and frequently changed by the stock feeder. From three to five pounds of molasses are frequently used per day per animal, and it is therefore desirable that the carrier to be of general use as such should carry a reasonably large percentage of molasses, so that in feeding the regular three to five pounds, the ration mixture may not be unbalanced by the addition of an excessive amount of the edible carrier.

The largest demand for molasses feeding comes from the dairy interests and stock breeders. With dairy cows twelve pounds is a large daily ration of a balanced concentrate mixture, but is not uncommon in cow testing, and in this mixture three separate ingredients are a practical minimum.

In order therefore that my material may be employed as one of the ingredients of a balanced ration mixture and at the same time supply approximately the requisite three pounds of molasses per cow per day, it will obviously be necessary that the carrier hold as a minimum approximately 75% of its own weight of molasses. In selecting a suitable carrier for the purposes of my invention, I prefer therefore to make the low limit of its molasses carrying capacity 75% of its own weight, since for use in balanced rations of the usual type any material which is incapable of carrying this percentage of its own weight of molasses would entail, in order to provide the required amount of molasses, the unbalancing of the ration in the loading up of the ration mixture with more than the proportionate amount of one of the ingredients, namely, the carrier of the molasses. I may say, therefore, that where the capacity of a carrier medium for taking up molasses falls below 75% of its own weight, it is not capable of efficient use for the purpose of this invention.

Where on the other hand the molasses carried amounts to more than 75% by weight of the carrier, it will be obvious that in a ration of the type described there may be a deficiency of one of the ingredients,—namely, the carrier—after sufficient of the material has been added to give the desired amount of molasses. In such cases enough of the carrier in plain state may be added to make up the deficiency.

It should be pointed out that by means of my invention not only is it possible to supply molasses for farm use in a form which greatly facilitates its handling at that end and its use with balanced rations, but among other things I greatly reduce the cost of the material itself in the elimination of the barrels commonly employed for transporting molasses, which at the present time when molasses is purchased must be paid for by the purchaser. These barrels after being acquired by the farmer or stock breeder are as a rule of no practical use to him, whereas bags or sacks in which it is proposed to transport my material are a common necessity on all farms and as a rule are purchased in large amounts annually for the handling and shipping of farm products. Furthermore, the leakage which is unavoidable in transporting raw molasses is entirely eliminated in my material.

It is further pointed out that the stock breeder or farmer who employs this material is not purchasing in my product anything undesirable or other than he would normally purchase, since bran is a material generally employed by all farmers and stock breeders, and probably would be purchased in plain form if not purchased in my product. The cost of the bran, therefore, in my product may be discounted, and it will be found that the reduction in the cost of the molasses itself is a material one.

It should be noted that the proportions of molasses in my material may be varied to suit particular conditions of use and special requirements. Thus the percentage of molasses in the material may vary with the nature of the balanced ration with which it is intended to be used and in accordance with other methods of feeding the material. For commercial purposes, it is proposed to manufacture the material with approximately 125% of molasses, this being considered the most practical proportion for general use.

It will be understood that though I specify and prefer to employ as my carrier medium wheat or other bran, I do not therefore limit myself to its use alone as a carrier medium. I have found for example that in a lesser degree middlings may be satisfactorily employed as a carrier for the molasses, and any material which has in any degree the general flaky composition of bran and the requisite absorbent capacity is particularly well adapted for the purposes of the invention. The invention, however, extends to any material regardless of its composition that can be made to carry 75% or more of its weight of molasses without objectionable packing or massing.

It will further be noted that though it is believed that practically it is essential that the carrier medium be a food in the sense of having nourishing elements, materials other than those recognized as foods may be employed if they afford the desired end product and if there are no actual deleterious effects upon the animals which consume it.

Whereas the form of product resulting from the processes of my invention vary from small grains to small concretionary masses or nodules, according to the nature of the carrier medium chosen and the varying characteristics of the molasses used, it is in every instance granular, in that it is composed of, contains, and bears grains or granules. I therefore use the word "granular" in my specification and claims in the broad and inclusive sense of grains and nodules, or small concretionary masses.

My invention is especially valuable to feed dealers and millers who compound balanced rations and feed mixtures for local farm trade but who are debarred from meeting the demand for a ration containing molasses as one of its ingredients because of lack of storage and heating tanks, expensive mixing machinery and drying equipment. Molasses treated by the processes covered by these specifications and claims resembles coarsely ground grains and concentrates and is equally adaptable to compounding by means of the simplest mixing devices.

I claim:

1. As a new article of manufacture, a granular stock feed adapted for mixing with the other ingredients of a predetermined or balanced ration, said granular stock feed comprising a base material and molasses unmodified by excessive heat in sufficient quantity to afford a desired normal daily ration of the latter in a day's ration of the predetermined or balanced mixture, the said base material not exceeding in amount the maximum permitted by the predetermined or balanced ration formula, and the mixture being so constituted as to resist or overcome the normal tendency of molasses compounds to coalesce in mass formations.

2. As a new article of manufacture, a granular stock feed adapted for mixing with the other ingredients of a predetermined or balanced ration, said granular feed comprising a base of bran and molasses unmodified by excessive heat in sufficient quantity to afford a normal daily ration of the latter in a day's ration of the predetermined or balanced mixture, the said base material not exceeding in amount the maximum permitted by the predetermined or balanced ration formula, and the mixture being so constituted as to resist or overcome the normal tendency of molasses compounds to coalesce in mass formations.

3. The method of forming a granular feed product containing molasses, which consists in mixing a carrier material with molasses to such degree of absorption of the molasses as shall leave substantially no free moisture, and thereafter agitating with a dusting material, substantially as described.

4. The method of forming a granular feed product containing molasses, which consists in mixing a carrier material with molasses to approximately maximum absorption, drying the mixture to the required degree of adhesiveness, and thereafter agitating with a dusting material, substantially as described.

5. The method of forming a granular feed product containing molasses, which consists in heating an absorbent material to drive off inherent moisture, heating the molasses approximately to 105° F., mixing the warm molasses with the said dried material, heating the mixture in a hot oven or drier to drive off excessive moisture and until the mixture is in semi-dry gummy condition, and mixing the mass with a finely divided material whereby the mixture is broken up into small masses or pellets, each having a coating of the said finely divided material.

6. The method of forming a molasses-containing feed product in homogeneous granular or concretionary masses separated each from the others by a coating of a suitable dusting material, which consists in mixing a carrier material with molasses in such proportion as not to leave free moisture in amount sufficient to saturate the dusting material, and thereafter incorporating said dusting material in such manner as to break up the molasses mixture into small granular or concretionary masses separated by the dusting material.

7. As a new article of manufacture, a feed product comprising molasses and a carrier medium in granular or concretionary masses separated each from the others by a coating of a suitable dusting material whereby objectionable adhesion of the granular masses is prevented.

WILLIAM BRADFORD OLIVER.